United States Patent
Li et al.

(10) Patent No.: US 9,858,653 B2
(45) Date of Patent: Jan. 2, 2018

(54) DEBLURRING AN IMAGE

(71) Applicant: Motorola Mobility LLC, Chicago, IL (US)

(72) Inventors: Dalong Li, Naperville, IL (US); Daniel Maack Bloom, Loveland, CO (US)

(73) Assignee: Motorola Mobility LLC, Chicago, IL (US)

( * ) Notice: Subject to any disclaimer, the term of this patent is extended or adjusted under 35 U.S.C. 154(b) by 37 days.

(21) Appl. No.: 15/013,232

(22) Filed: Feb. 2, 2016

(65) Prior Publication Data

US 2017/0221187 A1    Aug. 3, 2017

(51) Int. Cl.
*G06K 9/40* (2006.01)
*G06T 5/00* (2006.01)
*G06T 5/20* (2006.01)

(52) U.S. Cl.
CPC .......... *G06T 5/003* (2013.01); *G06T 5/20* (2013.01); *G06T 2207/20024* (2013.01); *G06T 2207/20048* (2013.01); *G06T 2207/20201* (2013.01)

(58) Field of Classification Search
CPC ......... G06T 3/4053; G06T 5/00; G06T 5/002; G06T 5/003; G06T 5/10; G06T 5/20; G06T 5/50; G06T 7/11; G06T 11/001; G06T 2207/10004; G06T 2007/10016; G06T 2007/10024; G06T 2207/10144; G06T 2207/10148; G06T 2207/20012; G06T 2207/20024; G06T 2207/20048; G06T 2207/20056; G06T 2207/20076; G06T 2207/20104; G06T 2207/20172; G06T 2207/20192; G06T 2207/20201; G06T 2207/20221; G06T 2207/20224; H04N 1/4092; H04N 5/208; H04N 5/232; H04N 5/23232; H04N 5/23248; H04N 5/23254; H04N 5/23258; H04N 5/23264; H04N 5/23267; H04N 5/2327; H04N 5/23277; H04N 5/235; H04N 5/2353; H04N 5/2355; H04N 5/2356; H04N 9/045; H04N 2101/00; H04N 2209/046; G03B 15/03; G03B 17/00; G06K 9/52; G06K 9/6218; G06K 2009/4666

See application file for complete search history.

(56) References Cited

U.S. PATENT DOCUMENTS 7,652,689 B2 * 1/2010 Fujiyama .......... H04N 5/23248
                                                  348/222.1
7,728,844 B2 * 6/2010 Trimeche .............. H04N 9/045
                                                  345/589

(Continued)

OTHER PUBLICATIONS

Sevket Derin Babacan, et al., "Bayesian Blind Deconvolution from Differently Exposed Image Pairs", IEEE Transactions on Image Processing, vol. 19, No. 11, Nov. 2010, pp. 2874-2888.

(Continued)

*Primary Examiner* — Jose Couso
(74) *Attorney, Agent, or Firm* — Kunzler PC

(57) ABSTRACT

For deblurring an image, a method records both short-exposed pixels at a higher frame rate for a short-exposure region and normal-exposed pixels at a normal frame rate for full resolution. In addition, the method deblurs a normal-exposed image as a function of the short-exposed pixels and the normal-exposed pixels.

20 Claims, 16 Drawing Sheets

(56) References Cited

U.S. PATENT DOCUMENTS

| | | | | |
|---|---|---|---|---|
| 7,756,407 | B2* | 7/2010 | Raskar | G03B 17/00 |
| | | | | 348/208.99 |
| 8,237,804 | B2* | 8/2012 | Torii | G03B 17/00 |
| | | | | 348/208.4 |
| 8,570,386 | B2* | 10/2013 | Castorina | H04N 5/23248 |
| | | | | 348/208.1 |
| 8,654,201 | B2* | 2/2014 | Lim | G06T 5/50 |
| | | | | 348/208.4 |
| 8,743,220 | B2* | 6/2014 | McGarry | H04N 3/1587 |
| | | | | 348/208.4 |
| 9,208,543 | B2* | 12/2015 | Wang | G06T 5/003 |
| 9,648,248 | B2* | 5/2017 | Gupta | H04N 5/23254 |
| 2007/0223831 | A1* | 9/2007 | Mei | G06T 5/50 |
| | | | | 382/260 |
| 2017/0064204 | A1* | 3/2017 | Sapiro | H04N 5/23267 |

OTHER PUBLICATIONS

Suk Hwan Lim and Amnon Silverstein, "Estimation and Removal of Motion Blur by Capturing Two Images with Different Exposures", HP Laboratories, Oct. 21, 2008, 8 pages.

Michal Sorel, et al., "Recent Advances in Space-Variant Deblurring and Image Stabilization", 2009, pp. 259-272.

M. Tallon, et al., "Combining Observation Models in Dual Exposure Problems Using the Kullback-Leibler Divergence", 18th European Signal Processing Conference, Aug. 23-27, 2010, pp. 323-327.

Miguel Tallon, et al., "Space-Variant Kernel Deconvolution for Dual Exposure Problem", 19th European Signal Processing Conference, Aug. 29-Sep. 2, 2011, pp. 1678-1682.

Marius Tico and Kari Pulli, "Image Enhancement Method Via Blur and Noisy Image Fusion", IEEE, Nov. 7-10, 2009, 4 pages.

Lu Yuan, et al., "Image Deblurring with Blurred/Noisy Image Pairs", ACM Transactions on Graphics, vol. 26, (3), Jul. 2007, 10 pages.

Yin-Hu Chen et al., "Capturing an Image Using Multi-Camera Automatic Focus", U.S. Appl. No. 15/398,532, filed Jan. 4, 2017, 33 pages.

Yin-Hu Chen et al., "Identifying a Focus Point in a Scene Utilizing a Plurality of Cameras", U.S. Appl. No. 15/459,621, filed Mar. 15, 2017, 42 pages.

* cited by examiner

230

| Pixel ID |
| 215 |
| Pixel Value |
| 220 |
| Exposure Type |
| 225 |

| Image ID |
| 345 |
| Pixel Data |
| 230 |
| Sharpness Value |
| 285 |

FIG. 2C

DEBLURRING AN IMAGE

FIELD

The subject matter disclosed herein relates to image processing and more particularly relates to deblurring an image.

BACKGROUND

Description of the Related Art

Images including digital images are often most attractive or useful when in sharp focus.

BRIEF SUMMARY

A method for deblurring an image is disclosed. The method records both short-exposed pixels at a higher frame rate for a short-exposure region and normal-exposed pixels at a normal frame rate for full resolution. In addition, the method deblurs a normal-exposed image as a function of the short-exposed pixels and the normal-exposed pixels. An apparatus also performs the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B is a schematic block diagram illustrating one embodiment of pixel data;

FIG. 2C is a schematic block diagram illustrating one embodiment of image data;

DETAILED DESCRIPTION

Figure 1:
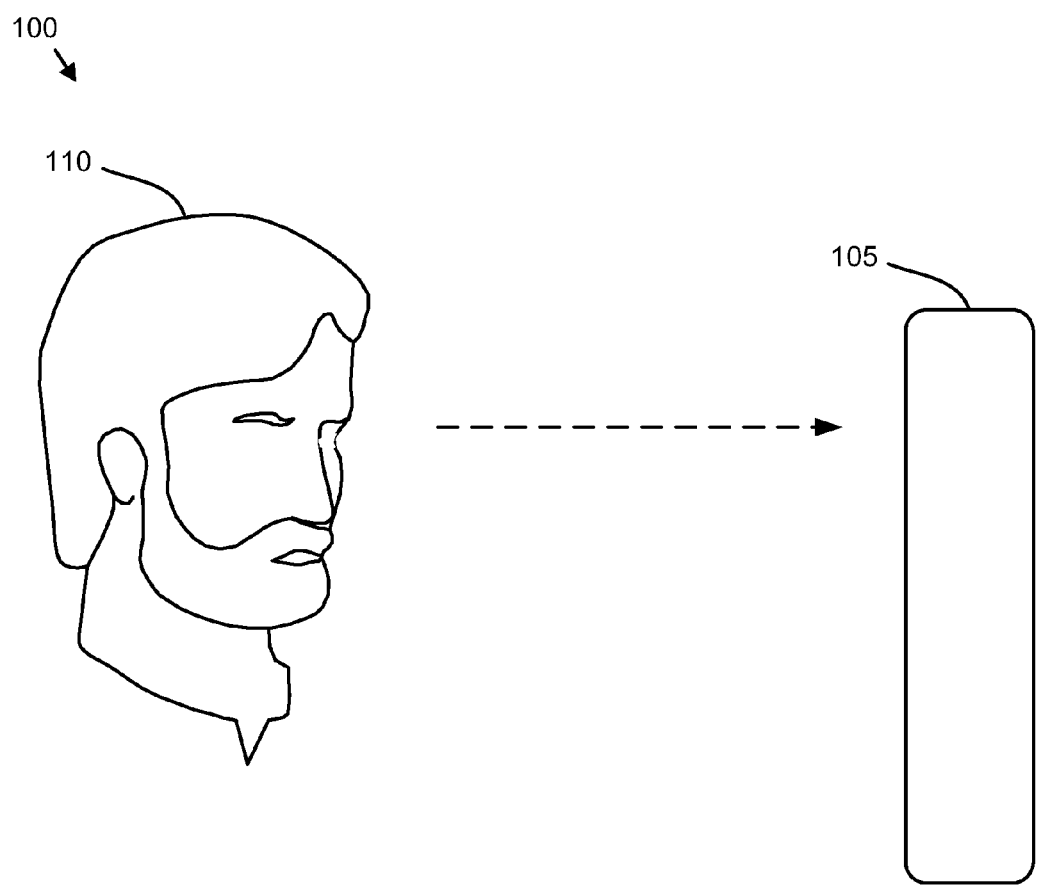
FIG. 1 is a drawing illustrating one embodiment of a camera system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a camera system 100. The camera system 100 may capture, record, and manage images. In the depicted embodiment, the camera system 100 includes an electronic device 105. The electronic device 105 may be a camera. Alternatively, the electronic device 105 may be a mobile telephone, a tablet computer, laptop computer, or the like with the camera embodied in the electronic device 105. The camera may capture an image of the subject 110.

The electronic device 105 may automatically adjust one or more camera parameters in order to capture the image. The attractiveness of the image may be enhanced when the image is in sharper focus. Unfortunately, because of improperly set camera parameters and/or the subject and lighting environment, the image may be blurred.

The embodiments described herein deblur a blurred image using short-exposed pixels and normal-exposed pixels as described hereafter. As used herein, deblur refers to sharpening the focus of an existing digital image. As a result, images that were blurred when captured and recorded may be made more attractive and useful, enhancing the usefulness of the camera and electronic device 105.

The embodiments also calculate a sharpness value for an image. The sharpness value may be used to select a sharpest image from a plurality of images. In addition, the sharpness value may be used to update camera parameters based on the sharpness value.

Figure 2A:
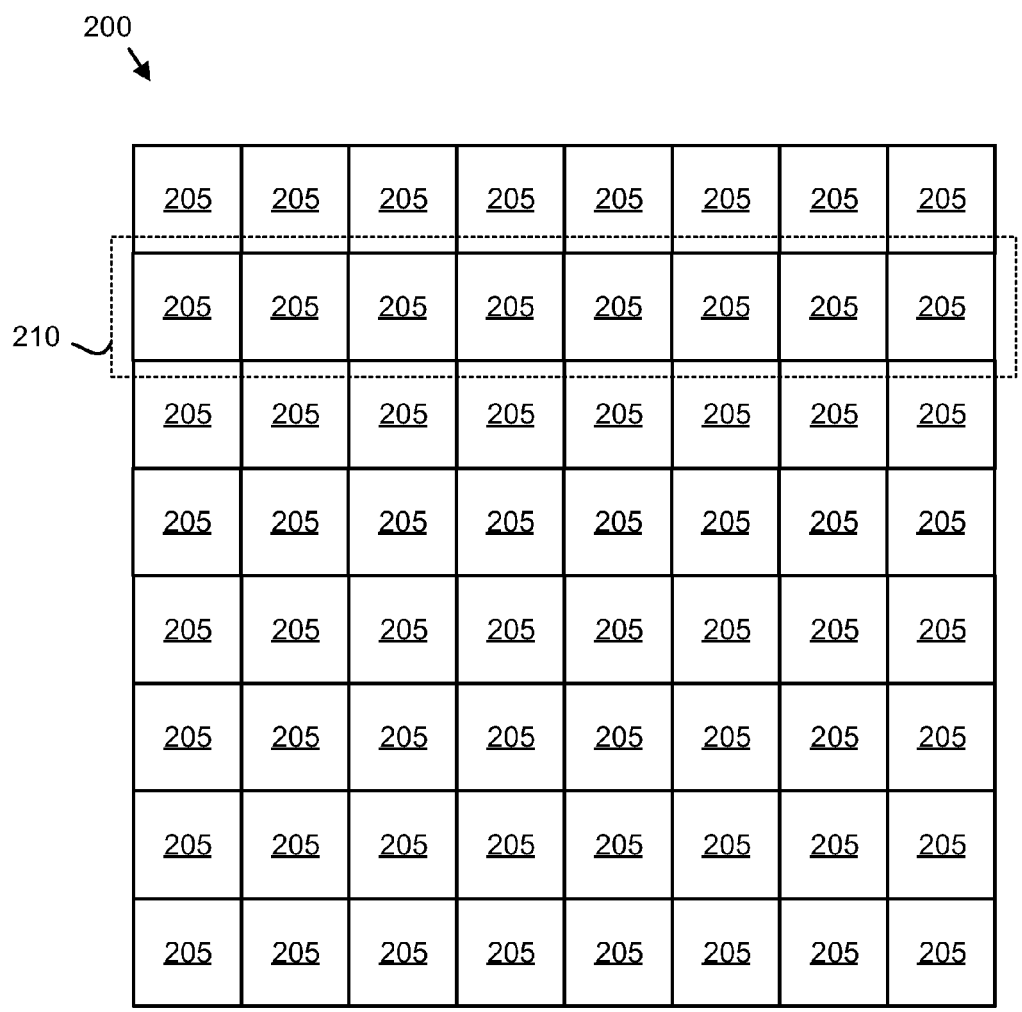
FIG. 2A is a schematic block diagram illustrating one embodiment of a light sensor array.

FIG. 2A is a schematic block diagram illustrating one embodiment of a light sensor array 200. The light sensor array 200 may be embodied in a camera. The light sensor array 200 includes a plurality of light sensors 205. For simplicity, only an 8×8 array of light sensors 205 is shown, although the light sensor array 200 may include any number and organization of light sensors 205. The light sensors 205 may record normal-exposed pixels at a normal frame rate for a full resolution image. Some of the light sensors 205 in a short-exposure region 210 may also record short-exposed pixels at a higher frame rate as well as recording the normal-exposed pixels at the normal frame rate. The light sensors 205 of the short-exposure region 210 may be selected based on a pixel variance as will be described hereafter.

In one embodiment, any light sensor 205 in the light sensor array 200 may record both short-exposed pixels and normal-exposed pixels. Alternatively, only light sensors 205 of the short-exposure region 210 may record the short-exposed pixels.

FIG. 2B is a schematic block diagram illustrating one embodiment of pixel data 230. The pixel data 230 may be organized as a data structure in a memory. Pixel data 230 may be recorded and stored by the light sensors 205 for each pixel in an image. In the depicted embodiment, the pixel data 230 includes a pixel identifier 215, a pixel value 220, and an exposure type 225.

The pixel identifier 215 may uniquely identify the pixel. In one embodiment, the pixel identifier 215 is a role and column address. The pixel value 220 may record an intensity of light captured by a light sensor 205. The pixel value 220 may be for a single color. Alternatively, the pixel value 220 may comprise intensities for multiple colors.

The exposure type 225 may specify whether a pixel is a short-exposed pixel or a normal-exposed pixel. For example, the exposure type 225 may comprise a bit flag that is set for short-exposed pixels and cleared for normal-exposed pixels. Alternatively, the exposure type 225 may be organized as a table that stores the pixel identifiers 215 for pixels in the short-exposure region 210.

FIG. 2C is a schematic block diagram illustrating one embodiment of image data 340 for an image. The image data 340 may be organized as a data structure in a memory. In the depicted embodiment, the image data 340 includes an image identifier 345, pixel data 230, and a sharpness value 285.

The image identifier 345 may uniquely identify the image. In one embodiment, the image identifier 345 is a filename.

The pixel data 230 may include the pixel data 230 for all pixels in the image. The sharpness value 285 may be calculated as a function of a correlation coefficient of the short-exposed pixels and the normal-exposed pixels at the short-exposure region 210 as will be described hereafter.

Figure 2D:
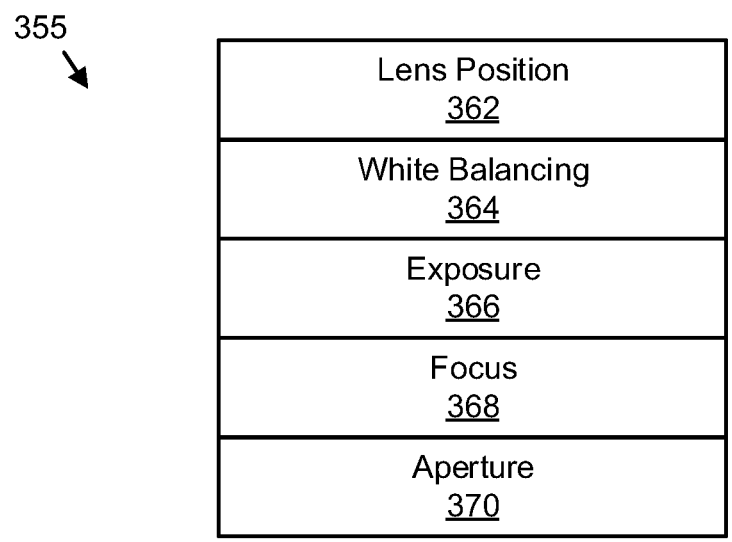
FIG. 2D is a schematic block diagram illustrating one embodiment of camera parameters.

FIG. 2D is a schematic block diagram illustrating one embodiment of camera parameters 355. The camera parameters 355 may be organized as a data structure in a memory. In the depicted embodiment, the camera parameters 355 include a lens position 362, white balancing 364, an exposure 366, a focus 368, and an aperture 370.

The lens position 362 may specify a position for one or more lenses of the camera. The white balancing 364 may specify a white balance for an image 120. The exposure 366 may specify an exposure time interval. The focus 368 may specify a focal arrangement of one or more lenses. The aperture 370 may specify an aperture size.

Figure 3A:
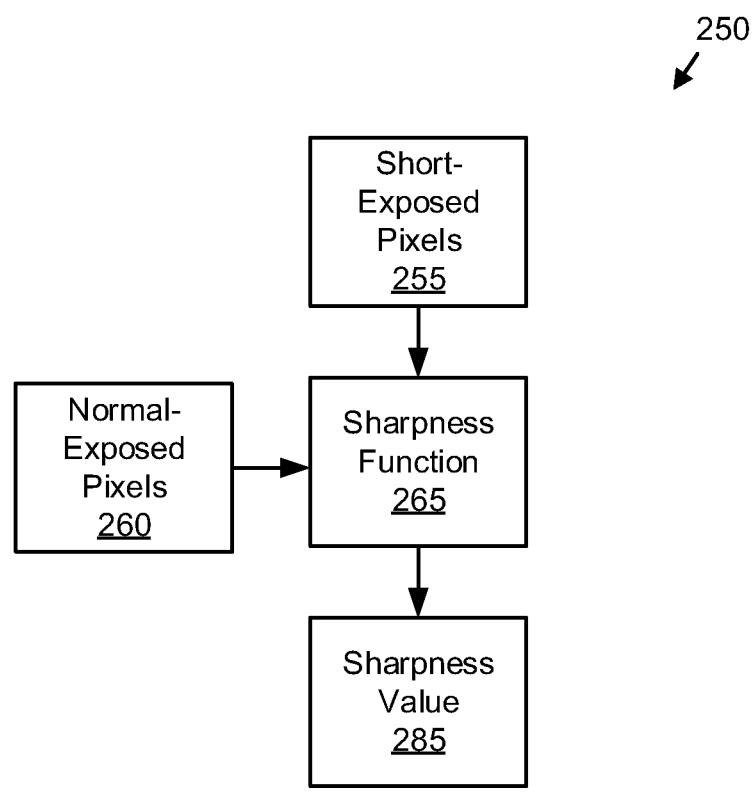
FIG. 3A is a schematic flow chart diagram illustrating one embodiment of a sharpness value calculation process.

FIG. 3A is a schematic flow chart diagram illustrating one embodiment of a sharpness value calculation process 250. The sharpness value calculation process 250 may be performed by the electronic device 105 and/or a camera and a processor embodied therein.

The camera may capture and the processor record one or more short-exposed pixels 255. The short-exposed pixels 255 may be recorded at the short-exposure region 210. In addition, the short-exposed pixels 255 may be recorded at a higher frame rate relative to a normal frame rate. The short-exposed pixels 255 may serve as a reference for calculating the sharpness value 285 and/or deblurring images.

The camera may also capture and the processor record normal-exposed pixels 260. The camera may capture the normal-exposed pixels 260 at the normal frame rate. In addition, the camera may capture the normal-exposed pixels 260 for a full resolution image.

A sharpness function 265 may calculate the sharpness value d 285 as a function of correlation coefficient r of the short-exposed pixels 255 and the normal-exposed pixels 260 at the short-exposure region 210. The sharpness value d 285 may be calculated using Equation 1.

$$d = 1 - |r| \qquad \text{Equation 1}$$

The correlation coefficient r may be calculated using Equation 2, where E is a correlation function, S is the short-exposed pixels 255, L is the normal-exposed pixels 260, $\mu_S$ is a mean of the short-exposed pixels 255, $\mu_L$ is a mean of the normal-exposed pixels 260, $\sigma_S$ is a standard deviation of the short-exposed pixels 255, and $\sigma_L$ is a stand deviation of the normal-exposed pixels 260.

$$r = \frac{E[(S - \mu_s)(L - \mu_L)]}{\sigma_S \sigma_L} \qquad \text{Equation 2}$$

The sharpness value 285 indicates a sharpness of the normal-exposed pixels 260. Alternatively, the correlation coefficient r may be calculated using Equation 3, wherein i is a row index of an ith pixel row, j is a column index of an jth pixel column, Sij is a short-exposed pixel 255, and Lij is a normal-exposed pixel 260.

$$r = \frac{\sum_i \sum_j (S_{ij} - \overline{S})(L_{ij} - \overline{L})}{\sqrt{\sum_i \sum_j (S_{ij} - \overline{S})^2} \sqrt{\sum_i \sum_j (L_{ij} - \overline{L})^2}} \qquad \text{Equation 3}$$

Figure 3B:
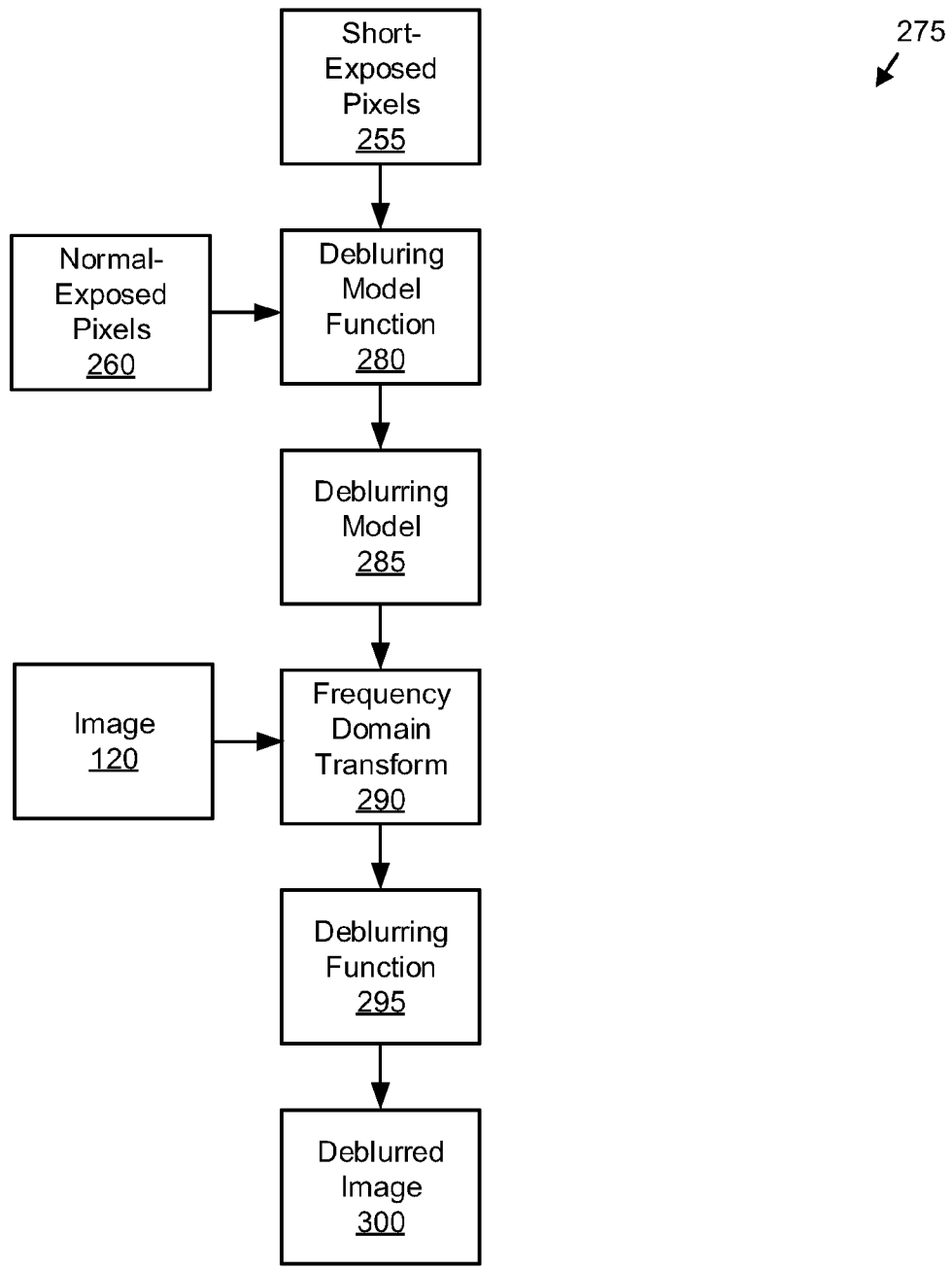
FIG. 3B is a schematic flow chart diagram illustrating one embodiment of a deblurring process.

FIG. 3B is a schematic flow chart diagram illustrating one embodiment of a deblurring process 275. The deblurring process 275 may deblur an image 120 recorded by the light sensor array 200. The deblurring process 275 may be performed by the electronic device 105, and/or a camera and a processor embodied within the electronic device 105.

The camera captures and the processor records both the short-exposed pixels 255 for the short-exposure region 210 and the normal-exposed pixels 260. The camera may also capture a normal-exposed image 120 using all light sensors 205 of the light sensor array 200. The normal-exposed pixels 260 may be recorded as part of the normal-exposed image 120. Alternatively, the normal-exposed pixels 260 are recorded separately from the normal-exposed image 120. A deblurring model function 280 may estimate a deblurring model h 285. The deblurring model h 285 may satisfy Equation 4, where g is the normal-exposed pixels 260 and f is the short-exposed pixels 255.

$$g = h*f \qquad \text{Equation 4}$$

In one embodiment, the deblurring model h 285 may be estimated using Equation 5, where S is the Toeplitz matrix of the short-exposed pixels 255 and L is the normal-exposed pixels 255.

$$h = (S^T S)^{-1}(S^T L) \qquad \text{Equation 5}$$

In one embodiment, a frequency domain transform 290 such as a Fourier transform generates a complex conjunction of a Fourier transform $H^*(f)$ of the deblurring model h 285. In addition, the frequency domain transform 290 may generate a frequency domain transform $S(f)$ such as a Fourier transform of the normal-exposed image 120.

A deblurring function 295 may deblur the normal-exposed image 120 and calculate the deblurred image 300. A frequency domain deblurred image $G(f)$ 300 may be calculated using Equation 6, where $S(f)$ is a Fourier transform of the normal-exposed image 120 and $N(f)$ is a power spectral density of noise.

$$G(f) = \frac{H*(f)S(f)}{|H(f)|^2 S(f) + N(f)} \qquad \text{Equation 6}$$

The time domain deblurred image g(t) 300 may be generated from the frequency domain deblurred image G(f) 300.

Figure 3C:
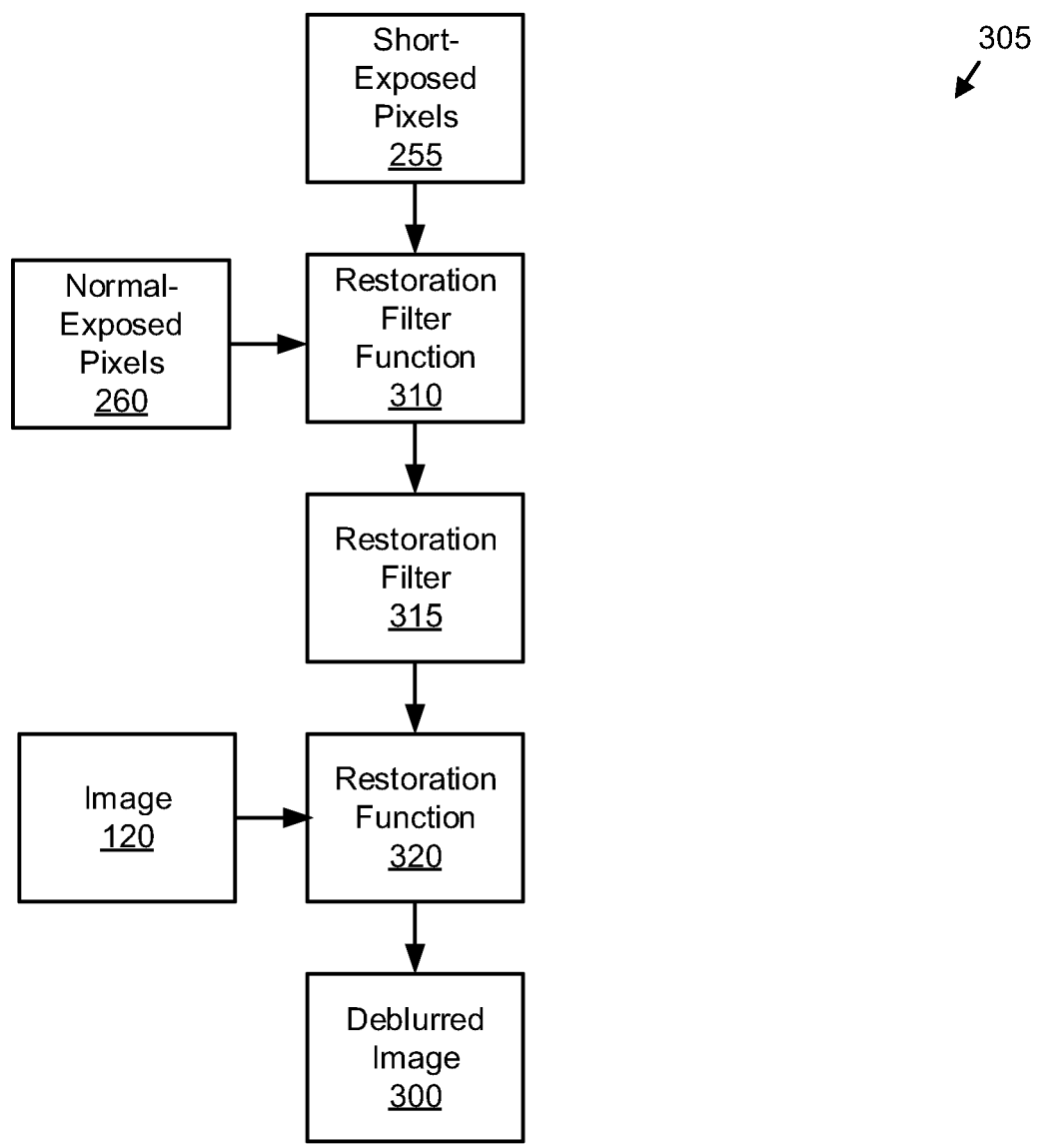
FIG. 3C is a schematic flow chart diagram illustrating one alternate embodiment of a deblurring process.

FIG. 3C is a schematic flow chart diagram illustrating one alternate embodiment of a deblurring process 305. The process 305 may deblur an image recorded by the light sensor array 220. The process 305 may be performed by the electronic device 105, and/or a camera and a processor embodied within the electronic device 105.

The camera captures and the processor records both the short-exposed pixels 255 for the short-exposure region 210 and the normal-exposed pixels 260. The camera may also capture a normal-exposed image 120 using all light sensors 205 of the light sensor array 200. The normal-exposed pixels 260 may be recorded as part of the normal-exposed image 120. Alternatively, the normal-exposed pixels 260 are recorded separately from the normal-exposed image 120. A restoration filter function 310 may estimate a restoration filter R 315. The restoration filter R 315 may satisfy Equation 7, where f is the short-exposed pixels 255 and g is the normal-exposed pixels 260.

$$f = R*g \qquad \text{Equation 7}$$

In one embodiment, the restoration filter function 310 estimates the restoration filter R 315 as a pseudo inverse function of the short-exposed pixels 255 and the normal-exposed pixels 260. The restoration filter R 315 may be calculated using Equation 8, where S is the Toeplitz matrix of the short-exposed pixels 255 and L is the normal-exposed pixels 255.

$$R = (L^T L)^{-1}(L^T S) \qquad \text{Equation 8}$$

A restoration function 320 may generate the deblurred image 300 using the restoration filter R 315 as illustrated in Equation 9, where g is the normal-exposed image 120 and $\hat{f}$ is the deblurred image 300.

$$\hat{f} = R*g \qquad \text{Equation 9}$$

Figure 3D:
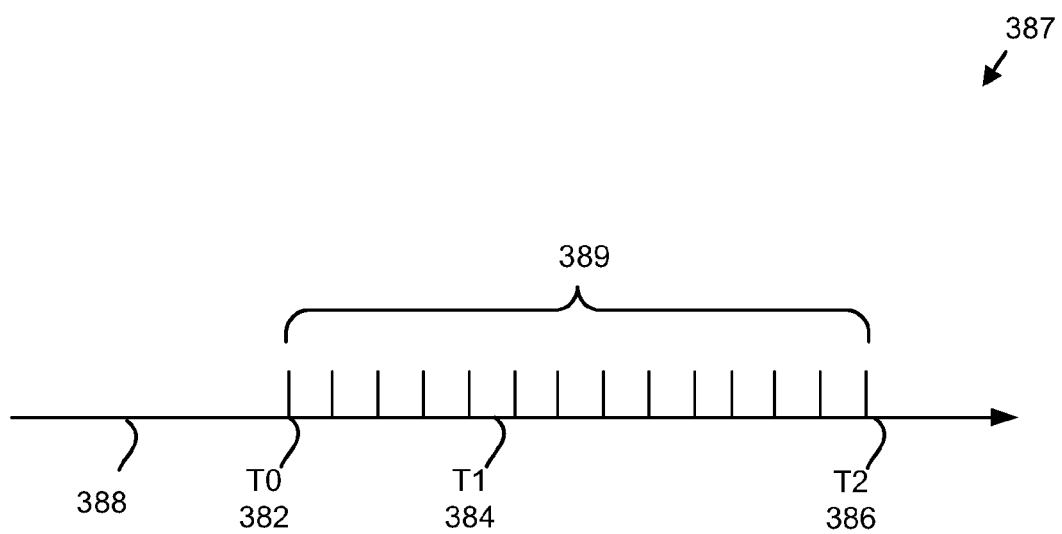
FIG. 3D is a drawing illustrating one embodiment of an image capture timeline.

FIG. 3D is a drawing illustrating one embodiment of an image capture timeline 387. In the depicted embodiment, a timeline arrow 388 depicts a flow of time. A trigger event T1 384 is shown on the timeline arrow 388. The trigger event 384 may be a command to capture an image 120 with the camera. In one embodiment, a plurality of images 120 may be captured at capture times 389 from an initial capture time T0 382 until a terminal capture time T2 386. The capture times 389 may be before the trigger event 384, concurrent with the trigger event 384, and after the trigger event 384.

Figure 3E:
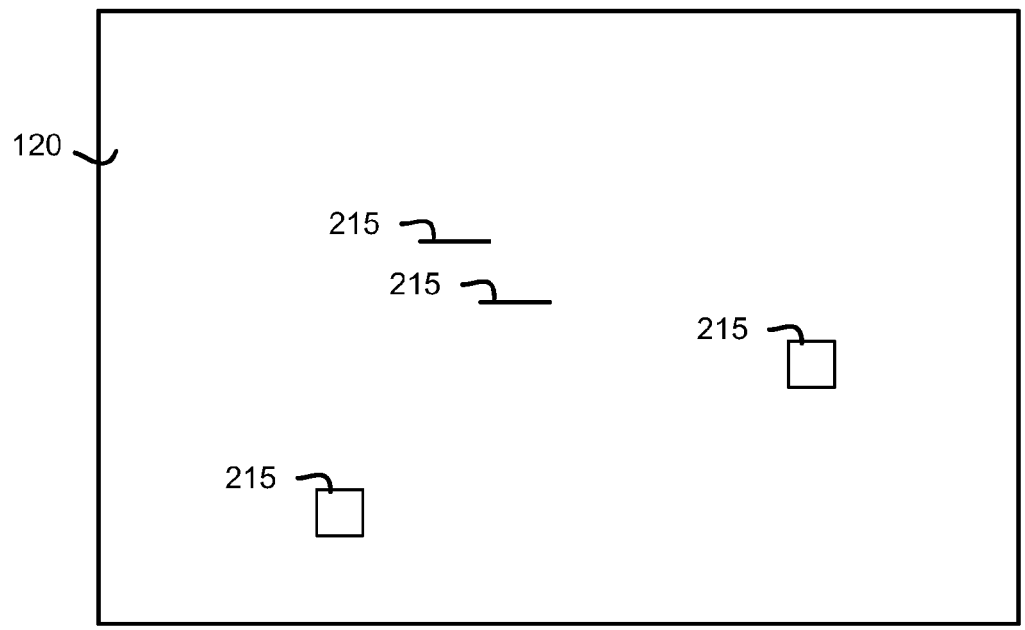
FIG. 3E is a drawing illustrating one embodiment of pixel testing.

FIG. 3E is a drawing illustrating one embodiment of pixel testing. In the depicted embodiment, a normal-exposure test image 120 is recorded by the light sensor array 200. The normal-exposure test image 120 is further divided into one or more regions 215. Each region 215 may include one or more pixels. A region 215 may be a vertical column of pixels, a horizontal row of pixels, and array of pixels, or the like. The exposure type 225 for the pixels may indicate normal-exposed pixels 260. In one embodiment, each region 215 is tested to determine a pixel variance.

Figure 3F:
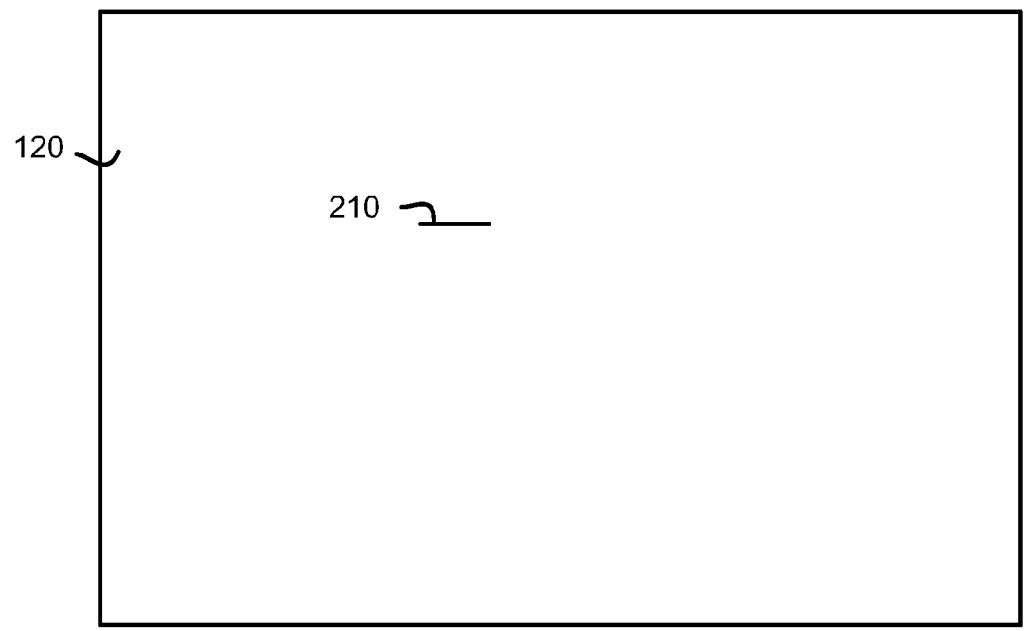
FIG. 3F is a drawing illustrating one embodiment of region selection.

FIG. 3F is a drawing illustrating one embodiment of region selection. In the depicted embodiment, one region 215 of FIG. 3E is selected as the short-exposure region 210. In one embodiment, a plurality of regions 215 may be selected as short-exposure regions 210. The short-exposure region 210 may have a greater pixel variance as will be described hereafter.

Figure 4:
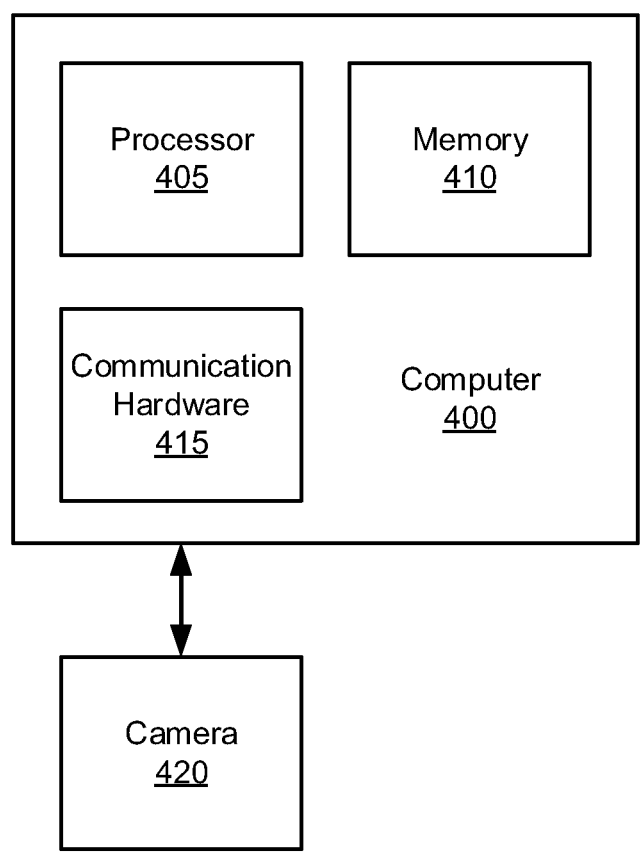
FIG. 4 is a schematic block diagram illustrating one embodiment of a computer.

FIG. 4 is a schematic block diagram illustrating one embodiment of a computer 400 and camera 420. The computer 400 and camera 420 may be embodied in the electronic device 105. In the depicted embodiment, the computer 400 includes a processor 405, memory 410, and communication hardware 415. The memory 410 may include a semiconductor storage device, hard disk drive, an optical storage device, a micromechanical storage device, and combinations thereof. The memory 410 may store code. The processor 405 may execute the code. The communication hardware 415 may communicate with other devices. For example, the communication hardware 415 may communicate with the camera 420. The camera 420 may record images 120.

Figure 5A:
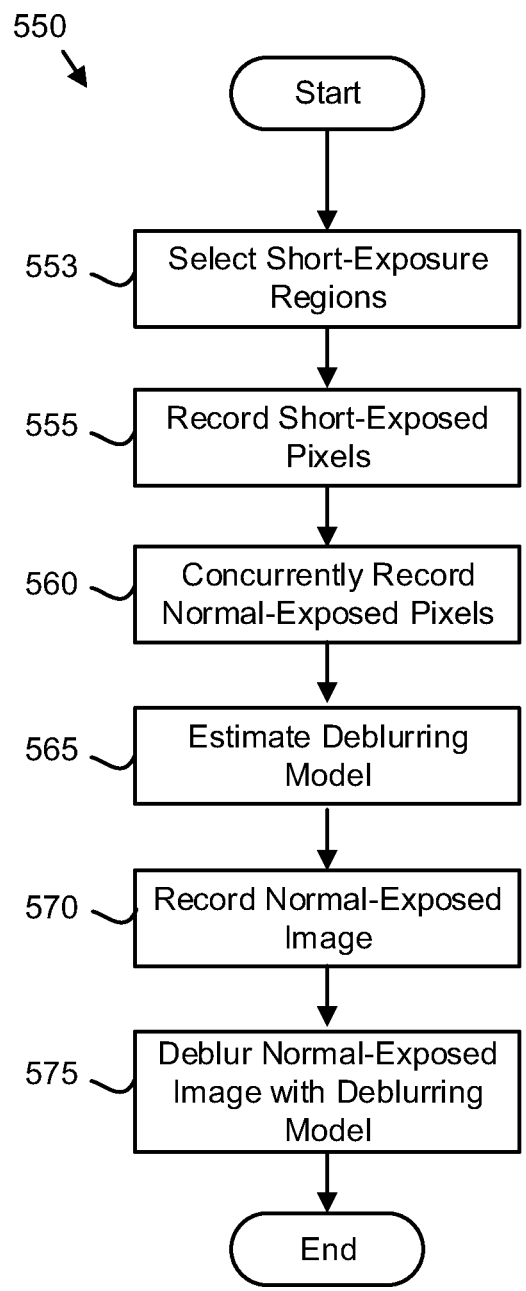
FIG. 5A is a schematic flowchart diagram illustrating one embodiment of a deblurring method.

FIG. 5A is a schematic flowchart diagram illustrating one embodiment of a deblurring method 550. The deblurring method 550 may deblur a normal-exposed image 120 using the deblurring model h 285. The method 550 may be performed by the electronic device 105 and/or the processor 405 and the camera 420 of the electronic device 105.

The method 550 starts, and in one embodiment, the processor 405 selects 553 one or more short-exposure regions 210. The short-exposure regions 210 may be preselected for specified light sensors 205. For example, one or more light sensors 205 may be fabricated to function as part of short-exposure regions 210. Alternatively, the short-exposure regions 210 may be selected 553 as described hereafter in FIG. 5C.

The processor 405 may record 555 the short-exposed pixels 255 at the higher frame rate for the short-exposure region 210. In addition, the processor 405 may concurrently record 560 the normal-exposed pixels 260 at the normal frame rate for full resolution. The camera 420 may capture the short-exposed pixels 255 and the normal-exposed pixels 260 with the light sensor array 200.

The processor 405 may estimate 565 the deblurring model h 285 from the short-exposed pixels 255 and the normal-exposed pixels 260. The processor 405 may employ the deblurring model function 280 to estimate 565 the deblurring model h 285. In one embodiment, the processor 405 may employ Equations 4 and 5 to estimate 565 the deblurring model h 285.

The processor 405 may record 570 a normal-exposed image 120. The normal-exposed image 120 may be captured with the light sensor array 200 of the camera 420 and recorded at a normal frame rate.

The processor 405 may deblur 575 the normal-exposed image 120 with the deblurring model h 285 and the method 550 ends. In one embodiment, the processor 405 transforms the normal-exposed image 120 and the deblurring model h 285 to the frequency domain using the frequency domain transform 290. In addition, the processor 405 may employ the deblurring function 295 to generate the deblurred image 300. In one embodiment, the processor 405 employs Equation 6 to deblur 575 the normal-exposed image 120 and generate the deblurred image 300.

Figure 5B:
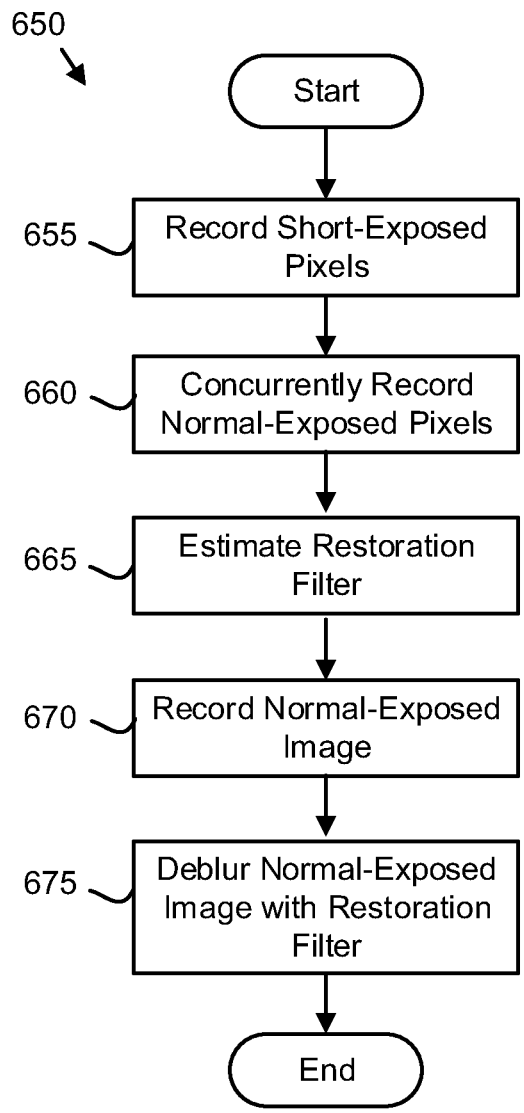
FIG. 5B is a schematic flow chart diagram illustrating one alternative embodiment of a deblurring method.

FIG. 5B is a schematic flow chart diagram illustrating one alternative embodiment of a deblurring method 650. The deblurring method 650 may deblur a normal-exposed image 120 using the restoration filter 315. The method 650 may be performed by the electronic device 105 and/or the processor 405 and the camera 420 of the electronic device 105.

The method 650 starts, and in one embodiment, the processor 405 records 655 the short-exposed pixels 255 at the higher frame rate for the short-exposure region 210. In addition, the processor 405 may concurrently record 660 the normal-exposed pixels 260 at the normal frame rate for full resolution. The camera 420 may capture the short-exposed pixels 255 and the normal-exposed pixels 260 with the light sensor array 200.

The processor 405 may estimate 665 the restoration filter 315. The processor 405 may employ may estimate 665 the restoration filter 315 using Equation 8. Alternatively, the processor 405 may estimate 665 the restoration filter 315 as a pseudo inverse function of the short-exposed pixels 255 and the normal-exposed pixels 260.

The processor 405 may record 670 a normal-exposed image 120. The camera 420 may capture the normal-exposed image 120. The processor 405 may deblur 675 the normal-exposed image 120 and the method 650 ends. In one embodiment, the processor 405 deblurs 675 the normal-exposed image 120 using the restoration function 320. In addition, the processor 405 may deblur 675 the normal-exposed image 120 using Equation 9.

Figure 5C:
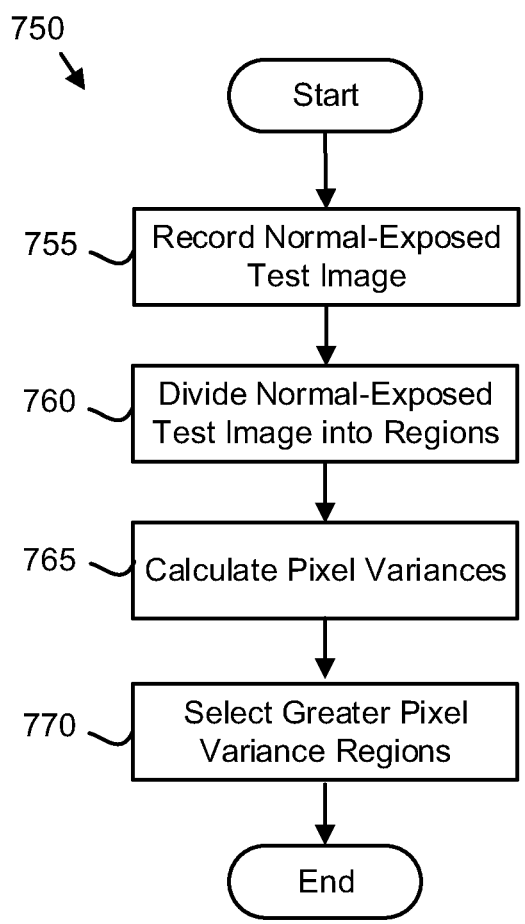
FIG. 5C is a schematic flow chart diagram illustrating one embodiment of a region selection method.

FIG. 5C is a schematic flow chart diagram illustrating one embodiment of a region selection method 750. The method 750 may select the short-exposure region 210 from one or more regions 215. The method 750 may be performed by the electronic device 105 and/or the processor 405 and the camera 420.

The method 750 starts, and in one embodiment, the processor 405 records 755 a normal-exposed test image 120. The camera 420 may capture the normal-exposed test image 120. The normal-exposed test image 120 may be recorded 755 from all the light sensors 205 of the light sensor array 200. In addition, the normal-exposed test image 120 may be recorded 755 for a normal frame rate.

The processor 405 may divide 760 the normal-exposed test image 120 into one or more regions 215. FIG. 3E shows one example of dividing 760 an image 120 into one or more regions 215.

The processor 405 may further calculate 765 a pixel variance for each region 215 of the one or more regions 215. In one embodiment, the pixel variance is calculated 765 as a difference between a maximum pixel value 220 and a mean pixel value 220 for pixels within a region 215. Alternatively, the pixel variance may be calculated 765 as a difference between a bimodal distribution of the pixel values 220 for the region 215.

The processor 405 may select 770 a region 215 having a greater pixel variance as the short-exposure region 210 and the method 750 ends. The region 215 with the greatest pixel variance may be selected 770 as the short-exposure region 210. In one embodiment, each region 215 with a pixel variance that exceeds a variance threshold is selected 770 as a short-exposure region 210 of a plurality of short-exposure regions 210. Alternatively, regions 215 with a greater pixel variance that are also located within a specified area of the normal-exposed test image 120 may be selected 770. For example, regions 215 nearest a center of the normal-exposed test image 120 that also have a pixel variance that exceeds the variance threshold may be selected 770.

Figure 5D:
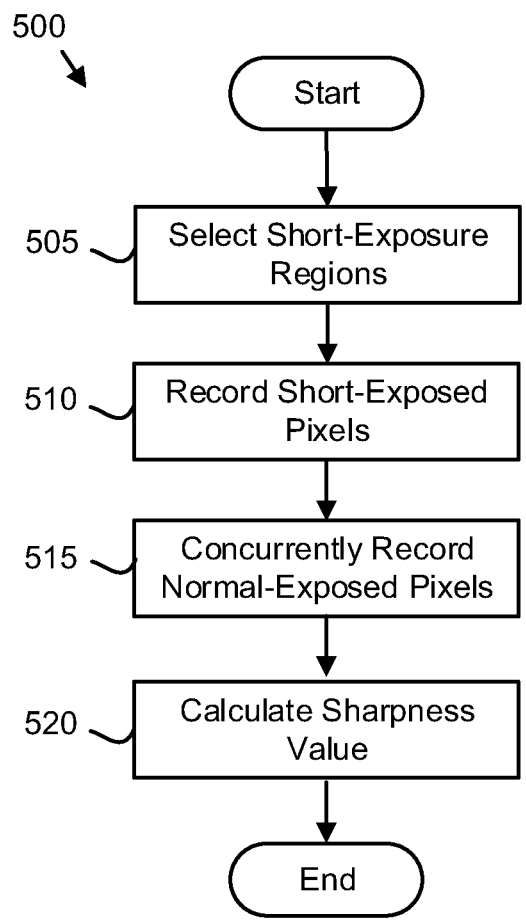
FIG. 5D is a schematic flow chart diagram illustrating one embodiment of a sharpness value calculation method.

FIG. 5D is a schematic flow chart diagram illustrating one embodiment of a sharpness value calculation method 500. The method 500 may calculate the sharpness value 285 for one or more images 120. The method 500 may be performed by the electronic device 105. In addition, the method 500 may be performed by the processor 405 and/or other semiconductor hardware embodied in the electronic device 105.

The method 500 starts, and in one embodiment, the processor 405 selects 505 one or more short-exposure regions 210. The short-exposure regions 210 may be preselected for specified light sensors 205. For example, one or more light sensors 205 may be fabricated to function as part of short-exposure regions 210. Alternatively, the short-exposure regions 210 may be selected 505 as described in FIG. 5C.

The processor 405 may further record 510 short-exposed pixels 255 at a higher frame rate for the short-exposure region 210. In addition, the processor 405 may concurrently record 515 the normal-exposed pixels 260 at a normal frame rate such as for a full resolution image 120. The short-exposed pixels 255 and normal-exposed pixels 260 may be captured by the camera 420.

The processor 405 may calculate 520 the sharpness value 285 and the method 500 ends. The processor 405 may employ the sharpness function 265 to calculate 520 the sharpness value 285. In one embodiment, the sharpness value 285 is calculated 520 as a function of a correlation coefficient r of the short-exposed pixels 255 and the normal-exposed pixels 260 at the short-exposure region 210. The correlation coefficient r may be calculated using one of Equations 2 and 3. The sharpness value d 285 may be calculated using Equation 1.

Figure 5E:
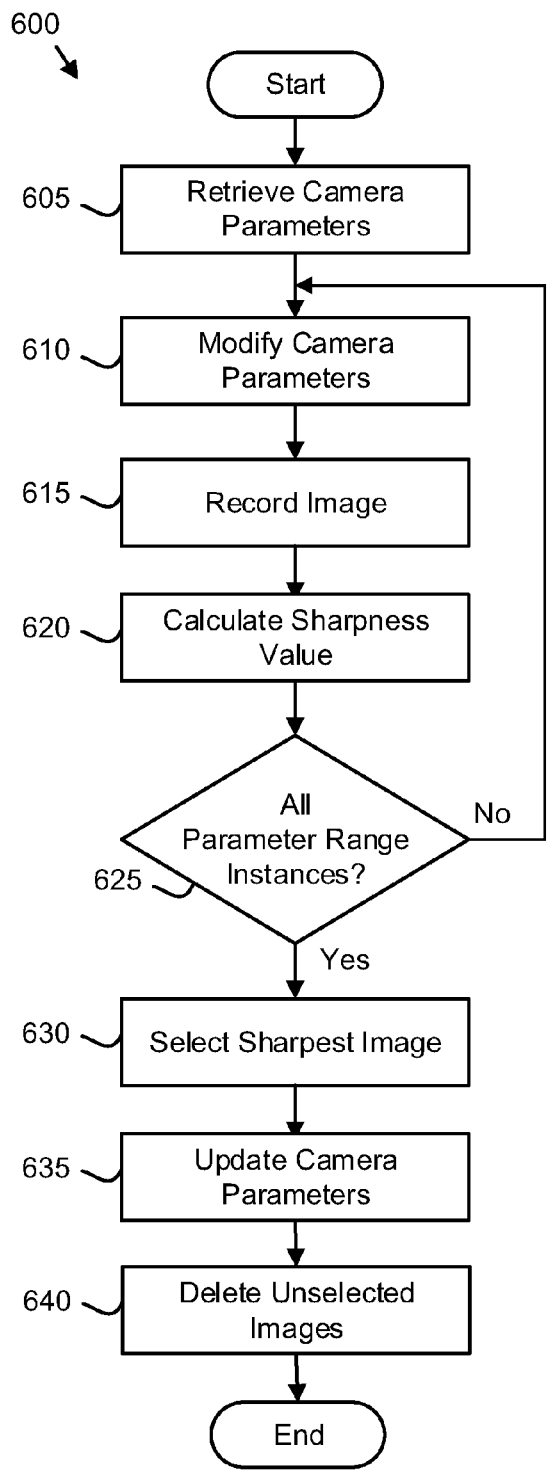
FIG. 5E is a schematic flow chart diagram illustrating one embodiment of a camera parameter update method.

FIG. 5E is a schematic flow chart diagram illustrating one embodiment of a camera parameter update method 600. The method 600 may update the camera parameters 355 based on the sharpness values 285 for one or more images 120. The method 600 may be performed by the electronic device 105.

In addition, the method 600 may be performed by the processor 405 and/or other semiconductor hardware embodied in the electronic device 105.

The method 600 starts, and in one embodiment, the processor 405 retrieves 605 the camera parameters 355 from the memory 410. The processor 405 may retrieve 605 default camera parameters 355. In addition, the processor 405 may modify 610 the camera parameters 355. In one embodiment, the processor 405 may modify 610 the camera parameters 355 based on the current scene observed by the camera.

Each of the camera parameters 355 such as the lens position 362, the white balancing 364, the exposure 366, the focus 368, and the aperture 370 may be associated with a range of values. Each combination of values for the camera parameters 355 may comprise an instance in a range of camera parameters 355. The processor 405 may modify 610 the camera parameters 355 to a specified instance within the range of camera parameters 355.

The electronic device 105 may record 615 an image 120 with a corresponding instance of camera parameters 355. The image 120 may be recorded at a normal frame rate. In one embodiment, the electronic device 105 records 615 a plurality of images 120 with corresponding camera parameters 355 for each image 120 of the plurality of images 120. Each image 120 may be captured and recorded 615 at a capture time 389 that is one of before the trigger event 384, concurrent with the trigger event 384, and after the trigger event 384. The processor 405 may further calculate 620 the sharpness value 285 for the image 120.

The processor 405 may determine 625 if images 120 have been captured for all instances of the range of camera parameters 355. If images for all instances of the range of camera parameters 355 have not been captured, the processor 405 may modify 610 the camera parameters 355 to a new instance of the range of camera parameters 355. All defined instances of the range of camera parameters 355 may eventually be used.

If images 120 for all instances of the range of camera parameters 355 have been recorded, the processor 405 may select 630 a sharpest image 120 with the greatest sharpness value 285. The processor 405 may further update 635 the default camera parameters 355 stored in the memory 410 with the instance of first camera parameters 355 corresponding to the sharpest image 120. As a result, the camera parameters 355 may be updated 635 to more useful values.

In one embodiment, the processor 405 further deletes 640 the unselected images 120 of the plurality of images 120 and the method 600 ends. As a result, the sharpest image 120 with the greatest sharpness value 285 may be retained by the electronic device 105.

Figure 5F:
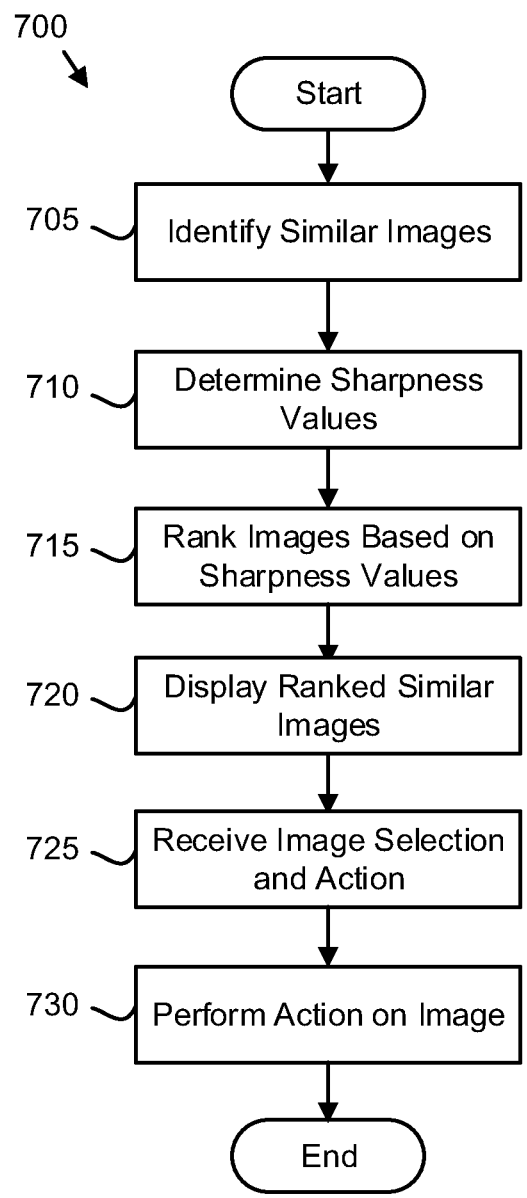
FIG. 5F is a schematic flow chart diagram illustrating one embodiment of an image ranking method.

FIG. 5F is a schematic flow chart diagram illustrating one embodiment of an image ranking method 700. The method 700 may rank a plurality of images 120 such as the images 120 in the image database 350. In addition, the method 700 may receive one or more image selections and actions associated with the image selections and perform the actions on the selected images 120. The method 700 may be performed by the electronic device 105. In addition, the method 700 may be performed by the processor 405, camera 420, and/or other semiconductor hardware embodied in the electronic device 105.

The method 700 starts, and in one embodiment, the processor 405 identifies 705 one or more similar images 120. The similar images 120 may be captured by the camera 420 between the initial capture time 382 and the terminal capture time 386. Alternatively, the similar images 120 may include any image 120 in the image database 350. The similar images 120 may be captured at the normal frame rate. In one embodiment, an image 120 is identified 705 as a similar image 120 if the image 120 has an image difference with another image 120 that is less than a difference threshold. As a result, the processor 405 may identify 705 the one or more similar images 120 that represent a similar scene and/or subjects.

The processor 405 may determine 710 the sharpness value 285 for each of the similar images 120. In one embodiment, the processor 405 may calculate the sharpness value 285 for each of the similar images 120. Alternatively, the processor 405 may retrieve the sharpness value 285 for each of the similar images 120 from the memory 410.

The processor 405 may rank 715 the similar images 120 based on the sharpness values 285. In one embodiment, the processor 405 rank 715 the similar images 120 from highest sharpness value 285 to lowest sharpness value 285.

The processor 405 may display 720 the ranked similar images 120. The similar images 120 may be displayed from highest sharpness value 285 to lowest sharpness value 285. The processor 405 may further receive 725 an image selection of one or more of the similar images 120 and/or an action associated with the selected similar images 120. The action may be a save action. Alternatively, the action may be a delete action.

In one embodiment, the processor 405 performs 730 an action on each image 120 of the plurality of similar images 120 and the method 700 ends. The processor 405 may perform 730 the action on each image 120 of the plurality of similar images 120 based on an image rank for each image 120. For example, a save action may be performed on one or more highest ranking images 120. Similarly, a delete action may be performed 730 on one or more lowest ranking images 120.

The processor 405 may perform 730 a selected action for one or more selected images 120. For example, if one or more highest ranking images 120 is selected and an enhance action is also selected, the processor 405 may perform the enhance action for the one or more selected highest ranking images 120. As a result, the sharpness value based ranking guides in the selection of the images 120.

The embodiments may deblur an image 120 as a function of the short-exposed pixels 255 and the normal-exposed pixels 260, increasing the sharpness and/or sharpness value 285 for the deblurred image 300. As a result, even if a blurred image 120 is recorded, the blurred image 120 may be deblurred as a more attractive and useful deblurred image 300.

The embodiments may also calculate a sharpness value 285 as a function of a correlation coefficient of the short-exposed pixels 255 and the normal-exposed pixels 260 at the short-exposure region 210. The sharpness value 285 may be used to update the camera parameters 355 for the camera 420. In addition, the sharpness value 285 may be used to rank similar images 120 based on the sharpness value 285 and perform actions such as saving sharp images 120 and deleting blurred images 120. As a result, the sharpness of images 120 that are both captured recorded may be increased, increasing the attractiveness and utility of the images 120.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    recording, by use of a processor, short-exposed pixels at a higher frame rate for a short-exposure region that is selected based on pixel variance;
    concurrently recording normal-exposed pixels at a normal frame rate for full resolution; and
    deblurring a normal-exposed image as a function of the short-exposed pixels and the normal-exposed pixels.

2. The method of claim 1, wherein the normal-exposed image is deblurred as a function of a deblurring model and the deblurring model h is estimated as $h=(S^TS)^{-1}(S^TL)$, where S is the Toeplitz matrix of the short-exposed pixels and L are the normal-exposed pixels.

3. The method of claim 1, wherein the normal-exposed image is deblurred as a deblurred image G(f) and the deblurred image G(f) is calculated as $$G(f) = \frac{H*(f)S(f)}{|H(f)|^2 S(f) + N(f)},$$

where H*(f) is a complex conjunction of a Fourier transform of the deblurring model, S(f) is a Fourier transform of the normal-exposed image, and N(f) is a power spectral density of noise.

4. The method of claim 1, wherein the normal-exposed image is deblurred as a function of a restoration filter and the restoration filter is estimated as a pseudo inverse function of the short-exposed pixels and the normal-exposed pixels and the restoration filter R is estimated as $R=(L^TL)^{-1}(L^TS)$, where S is the Toeplitz matrix of the short-exposed pixels and L are the normal-exposed pixels.

5. The method of claim 1, the method comprising:
    recording a normal-exposed test image;
    dividing the normal-exposed test image into one or more regions;
    calculating a pixel variance for each region; and
    selecting a region having a greater pixel variance as the short-exposure region.

6. The method of claim 1, the method further comprising calculating a sharpness value as function of a correlation coefficient of the short-exposed pixels and the normal-exposed pixels at the short-exposure region.

7. The method of claim 6, wherein the sharpness value d is calculated as d=1−|r|, where r is the correlation coefficient and is calculated as $$r = \frac{E[(S-\mu_S)(L-\mu_L]}{\sigma_S \sigma_L},$$

where S is the short-exposed pixels, L is the normal-exposed pixels, $\mu_S$ is a mean of the short-exposed pixels, $\mu_L$ is a mean of the normal-exposed pixels, $\sigma_S$ is a standard deviation of the short-exposed pixels, and $\sigma_L$ is a standard deviation of the normal-exposed pixels.

8. The method of claim 6, wherein the sharpness value d is calculated as d=1−|r|, where r is the correlation coefficient and r is calculated as $$r = \frac{\sum_i \sum_j (S_{ij}-\bar{S})(L_{ij}-\bar{L})}{\sqrt{\sum_i \sum_j (S_{ij}-\bar{S})^2} \sqrt{\sum_i \sum_j (L_{ij}-\bar{L})^2}},$$

wherein i is a row index of an ith pixel row, j is a column index of an jth pixel column, Sij is a short-exposed pixel, and Lij is a normal-exposed pixel.

9. The method of claim 6, the method further comprising:
    recording a plurality of images with corresponding camera parameters for each image of the plurality of images, wherein each image is captured at a capture time that is one of before a trigger event, concurrent with the trigger event, and after the trigger event;
    calculating a sharpness value for each image of the plurality of images;
    selecting a sharpest image with a greatest sharpness value;
    updating default camera parameters with first camera parameters corresponding to the sharpest image; and
    deleting unselected images of the plurality of images.

10. The method of claim 6, the method further comprising:
    identifying a plurality of similar images;
    determining a sharpness value for each image of the plurality of similar images;
    ranking the plurality of similar images based on the sharpness values; and
    performing an action on each image of the plurality of similar images based on an image rank for the image.

11. An apparatus comprising:
    a processor that performs:
    recording short-exposed pixels at a higher frame rate for a short-exposure region that is selected based on pixel variance;
    concurrently recording normal-exposed pixels at a normal frame rate for full resolution; and
    deblurring a normal-exposed image as a function of the short-exposed pixels and the normal-exposed pixels.

12. The apparatus of claim 11, wherein the normal-exposed image is deblurred as a function of a deblurring model and the deblurring model h is estimated as $h=(S^TS)^{-1}(S^TL)$, where S is the Toeplitz matrix of the short-exposed pixels and L are the normal-exposed pixels.

13. The apparatus of claim 11, wherein the normal-exposed image is deblurred as a deblurred image G(f) and the deblurred image G(f) is calculated as $$G(f) = \frac{H*(f)S(f)}{|H(f)|^2 S(f) + N(f)},$$

where H*(f) is a complex conjunction of a Fourier transform of the deblurring model, S(f) is a Fourier transform of the normal-exposed image, and N(f) is a power spectral density of noise.

14. The apparatus of claim 11, wherein the normal-exposed image is deblurred as a function of a restoration filter and the restoration filter is estimated as a pseudo inverse function of the short-exposed pixels and the normal-exposed pixels and the restoration filter R is estimated as $R=(L^TL)^{-1}(L^TS)$, where S is the Toeplitz matrix of the short-exposed pixels and L are the normal-exposed pixels.

15. The apparatus of claim 11, the processor further performing:
 recording a normal-exposed test image;
 dividing the normal-exposed test image into one or more regions;
 calculating a pixel variance for each region; and
 selecting a region having a greater pixel variance as the short-exposure region.

16. The apparatus of claim 11, the processor further calculating a sharpness value as function of a correlation coefficient of the short-exposed pixels and the normal-exposed pixels at the short-exposure region.

17. The apparatus of claim 16, wherein the sharpness value d is calculated as d=1−|r|, where r is the correlation coefficient and is calculated as $$r = \frac{E[(S-\mu_s)(L-\mu_L)]}{\sigma_S \sigma_L},$$

where S is the short-exposed pixels, L is the normal-exposed pixels, $\mu_S$ is a mean of the short-exposed pixels, $\mu_L$ is a mean of the normal-exposed pixels, $\sigma_S$ is a standard deviation of the short-exposed pixels, and $\sigma_L$ is a standard deviation of the normal-exposed pixels.

18. The apparatus of claim 16, wherein the sharpness value d is calculated as d=1−|r|, where r is the correlation coefficient and r is calculated as $$r = \frac{\sum_i \sum_j (S_{ij}-\bar{S})(L_{ij}-\bar{L})}{\sqrt{\sum_i \sum_j (S_{ij}-\bar{S})^2}\sqrt{\sum_i \sum_j (L_{ij}-\bar{L})^2}},$$

wherein i is a row index of an ith pixel row, j is a column index of an jth pixel column, Sij is a short-exposed pixel, and Lij is a normal-exposed pixel.

19. The apparatus of claim 16, the processor further performing:
 recording a plurality of images with corresponding camera parameters for each image of the plurality of images, wherein each image is captured at a capture time that is one of before a trigger event, concurrent with the trigger event, and after the trigger event;
 calculating a sharpness value for each image of the plurality of images;
 selecting a sharpest image with a greatest sharpness value;
 updating default camera parameters with first camera parameters corresponding to the sharpest image; and
 deleting unselected images of the plurality of images.

20. The apparatus of claim 16, the processor further performing:
 identifying a plurality of similar images;
 determining a sharpness value for each image of the plurality of similar images;
 ranking the plurality of similar images based on the sharpness values; and
 performing an action on each image of the plurality of similar images based on an image rank for the image.

\* \* \* \* \*